United States Patent [19]
Boehner et al.

[11] 3,886,280
[45] May 27, 1975

[54] TRIAZOLYL CARBAMATE INSECTICIDES
[75] Inventors: Beat Boehner, Binningen; Dag Dawes, Pratteln, both of Switzerland
[73] Assignee: Ciba-Geigy Corporation, Ardsley, N.Y.
[22] Filed: Oct. 10, 1973
[21] Appl. No.: 405,238

Related U.S. Application Data
[62] Division of Ser. No. 221,052, Jan. 26, 1972, Pat. No. 3,794,661.

[30] Foreign Application Priority Data
Feb. 4, 1971 Switzerland.......................... 1634/71
Jan. 7, 1972 Switzerland........................... 274/72

[52] U.S. Cl.............................. 424/269; 424/DIG. 8
[51] Int. Cl............................................. A01n 9/22
[58] Field of Search.................. 424/269; 260/308 R

[56] References Cited
FOREIGN PATENTS OR APPLICATIONS
681,376 10/1952 United Kingdom............. 260/308 R Primary Examiner—V. D. Turner
Attorney, Agent, or Firm—Harry Falber; Frederick H. Rabin

[57] ABSTRACT
Triazolyl carbamates of the formula

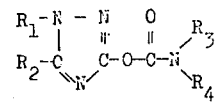

wherein $R_1$ represents hydrogen, alkyl or cycloalkyl, $R_2$ represents hydrogen, alkyl or the groups —COOR$_1$—CO—N($R_3$)-($R_4$) or -CN, $R_3$ represents hydrogen, alkyl, alkoxy or alkinyl, $R_4$ represents alkyl, alkenyl, alkinyl, alkoxy, cycloalkyl or phenyl, and $R_3$ and $R_4$ together with the nitrogen atom to which they are bonded, represents a heterocyclic radical, their manufacture and their use in pest control.

10 Claims, No Drawings

TRIAZOLYL CARBAMATE INSECTICIDES

This is a division, of application Ser. No. 221,052, filed Jan. 26, 1972 now U.S. Pat. No. 3,799,661.

The present invention to new triazolyl carbamates, their manufacture and their use in pest control.

The triazolyl carbamates correspond to the formula

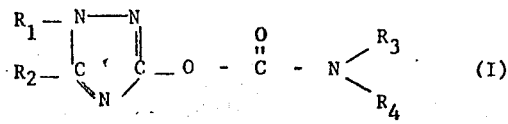

wherein $R_1$ represents hydrogen, alkyl or cycloalkyl, $R_2$ represents hydrogen, alkyl or the groups —$COOR_1$, —CO—N($R_3$)-($R_4$) or —CN, $R_3$ represents hydrogen, alkyl, alkoxy or alkinyl, $R_4$ represents alkyl, alkenyl, alkinyl, alkoxy, cycloalkyl or phenyl, and $R_3$ and $R_4$ together with the nitrogen atom to which they are bonded, represents a heterocyclic radical.

The alkoxy, alkyl, alkenyl and alkinyl chains represented by $R_1$, $R_2$, $R_3$ and $R_4$ respectively contain from 1 to 18 or 2 to 18 carbon atoms (in the case of the alkenyl and alkinyl radicals), but contain preferably 1 to 4 or 2 to 4 carbon atoms. These radicals may be branched or straight-chained, unsubstituted or substituted. Examples of such radicals include: methyl, methoxy, trifluoromethyl, ethyl, ethoxy, cyanoethyl, propyl, isopropyl, n-, i-, sec.- and tert.butyl, allyl, crotonyl, methallyl, propargyl or n-butyl.

The cycloalkyl radicals represented by $R_1$ and $R_4$ have 3 to 7, preferably 5 or 6 ring members. The phenyl radical which may be represented by $R_4$ may be unsubstituted or substituted.

The substituents at the alkoxy alkyl, alkenyl, alkinyl and phenyl radicals may be of the first or second order.

The substituents at the alkyl, alkenyl, alkinyl, acyl, naphthyl and phenyl radicals may be of the first or second order.

By substituents of the firsts order are meant electron donors which increase the basicity. These include the the following groups: halogen atoms, for example fluorine, chlorine, bromine, or iodine, alkoxy and alkylthio groups containing from 1 to 4 carbon atoms and which may be branched or unbranched, but are preferably unbranched and contain from 1 to 2 carbon atoms; lower alkoxyalkyl and alkyl groups, to which the definitions given hereinabove also apply here; secondary and tertiary amino groups, preferred substituents being lower alkyl and alkanoyl groups; hydroxyl and mercapto groups. The naphthyl and phenyl radical may also be substituted by alkyl, mono- and dihaalogenoalkyl groups.

By substituents of the second order are meant acidifying electron donors. These include the following groups: nitrol and cyano groups; trihalogenaoalkyl groups, in which halogen represents preferably fluorine or chlorine; lower alkysulphinyl and lower alkyl sulphonyl groups which contain a branched or unbranched alkyl radical having 1 to 4 carbon atoms, preferably one unbranched alkyl radical having 1 to 2 carbon atoms; sulphamyl and sulphamido groups, it being possible for the amino groups to carry one or two substituents, preferably lower alkyl groups, as defined hereinabove.

Particular importance attaches to compounds of the formula

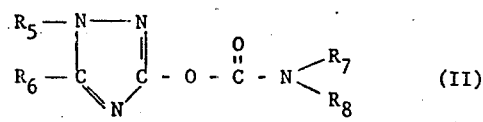

wherein $R_5$ represents hydrogen, $C_1$–$C_6$ alkyl or $C_3$–$C_6$ cycloalkyl, $R_6$ represents hydrogen, $C_1$–$C_4$ alkyl or the groups —$COOR_5$, —CO-N($R_7$) ($R_8$), $R_7$ represents hydrogen or $C_1$–$C_4$ alkyl and $R_8$ represents $C_1$–$C_4$ alkyl, $C_1$–$C_4$ alkoxy or phenyl, Pre-eminent compounds of the formula (II) have the following formula:

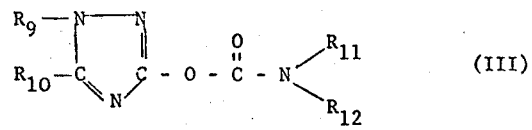

wherein $R_9$ represents $C_1$–$C_6$ alkyl, cyclopentyl or cyclohexyl, $R_{10}$ represents hydrogen, $C_1$–$C_4$ alkyl or the groups —$COOH_3$, $COOC_2H_5$ or $$-CON\begin{matrix}CH_3\\CH_3\end{matrix},$$

$R_{11}$ represents hydrogen, methyl or ethyl and $R_{12}$ represents methyl, ethyl, methoxy or phenyl.

The compounds of the formula I may be manufactured according to the methods which are in themselves known, for example by a. reacting a hydroxy-triazole of the formula

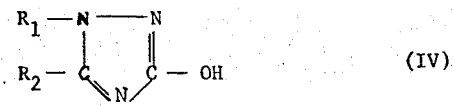

with a carbamyl halide of the formula

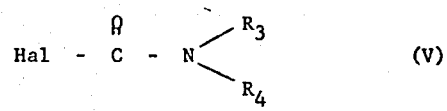

or

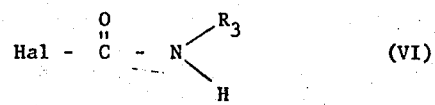

in the presence of an acid binding agent, or b. reacting a salt of a hydroxy-triazole of the formula (IV) with a carbamyl halide of the formula (V) or (VI), or c. reacting a hydroxy-triazole of the formula (IV) with phosgene and reacting the intermediate product with a compound of the formula

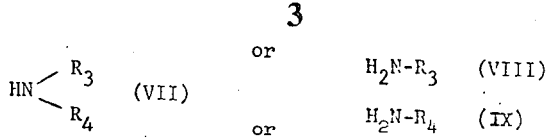

or

In the formula (IV) to (IX), the symbols $R_1$ to $R_4$ have the meanings given for the formula I. Hal represents fluorine, chlorine, bromine or iodine, but especially chlorine or bromine.

As salts of hydroxy-triazoles of the formula (IV) which are suitable for the process of the invention there may be used, for example, salts of monovalent metals, in particular the alkali metal salts, such as the sodium or potassium salts.

As acid binding agents the following bases may for example be used: tertiary amines, such as triethylamine, dimethyl aniline, pyridine, pyridine bases; inorganic bases, such as hydroxides and carbonates of alkali and alkaline earth metals, preferably sodium and potassium carbonate.

It is advisable to carry out the reaction in inert solvents, of which the following may be cited as examples which are suitable for the purpose: aromatic hydrocarbons, such as benzene, toluene, xylene, gasolines, chlorobenzenes, polychlorobenzenes, bromobenzene; chlorinated alkanes containing from 1 to 3 carbon atoms; ethers, such as dioxan or tetrahydrofuran; esters, such as ethyl acetate; ketones, such as acetone, methyl ethyl ketone, diethyl ketone.

Some of the starting material of the formula (IV) are known compounds. They may be manufacutred according to processes which are known in the art, for example by reacting a correspondingly substituted semicarbazide with orthoformic acid esters.

The compounds of the formula I have a broad biocidal activity spectrum and may be used for combating various vegetable and animal pests and as growth regulators.

In particular, the compounds of the formula I possess insecticidal properties and may be used against all development stages such, for example, as eggs, larvae, pupae, nymphs and adults of insects and representatives of the order acarina, for example against insects of the families:

| | |
|---|---|
| *Teltigonidae* | *Tenebrionidae* |
| *Gryllidae* | *Chrysomelidae* |
| *Gryllotalpidae* | *Bruchidae* |
| *Blattidae* | *Tineidae* |
| *Peduviidae* | *Noctindae* |
| *Phyrrhocoriae* | *Lymatriidae* |
| *Cimicidae* | *Pyralidae* |
| *Delphacidae* | *Culicidae* |
| *Aphididae* | *Tipulidae* |
| *Diaspididae* | *Stomoxydae* |
| *Pseudococcidae* | *Trypetidae* |
| *Scarabaeidae* | *Muscidae* |
| *Dermestidae* | *Calliphoridae* and |
| *Coccinellidae* | *Pulicidae* |

The insecticidal action can be substantially broadended and adapted to the particular circumstances by the addition of other insecticides.

Suitable additives include, for example, the following active substances:

Organic derivatives of phosphorus

Bis- 0,0-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-(dimethoxyphosphinyloxy)-N,N-dimethyl-cis-crotonamide (DICROTOPHOS)
2-chloro-2-diethylcarbamoyl-1-methylvinyldimethylphosphate (PHOSPHAMIDON)
0,0-diethyl-0(or S)-2-(ethylthio)-ethylthiophosphate (DEMETON)
S-ethylthioethyl-0,0-dimethyl-dithiophosphate (THIOMETON)
0,0-diethyl-S-ethylmercaptomethyldithiophosphate (PHORATE)
0,0-diethyl-S-2-ethylthio)ethyldithiophosphate (DISULFOTON)
0,0-dimethyl-S-2-(ethylsulphinyl)ethylthiophosphate (OXYDEMETONMETHYL)
0,0-dimethyl-S-(1,2-dicarbethoxyethyldithiophosphate MALATHION)
0,0,0,0-tetraethyl-S,S'-methylene-bis-dithiophosphate (ETHION)
0-ethyl-S,S-dipropyldithiophosphate
0,0-dimethyl-S-(N-methyl-N-formylcarbamoylmethyl)-dithiophosphate (FORMOTHION)
0,0-dimethyl-S-(N-methylcarbamoylmethyl)dithiophosphate 0,0-dimethyl-0-p-nitrophenylthiophosphate (DIMETHOATE)
0,0-dimethyl-0-p-nitrophenylthiophosphate (PARATHHION-METHYL)
0,0-diethyl-0-p-nitrophenylthiophosphate (PARATHION)
0-ethyl-0-p-nitrophenylphenylthiophosphate (EPN)
0,0-dimethyl-0-(4-nitro-m-tolyl)thiophosphate (FENITROTHION)
0,0-dimethyl-0-2,4,5-trichlorophenylthiophosphate (RONNEL)
0-ethyl-0,2,4,5-trichlorophenylethylthiophosphate (TRICHLORONATE)
0,0-dimethyl-0,2,5-dichloro-4-bromophenylthiophosphate (BROMOPHOS)
0,0-dimethyl-0-(2,5-dichloro-4-jodphenyl)-thiophosphate (JODOFENPHOS)
4-tert. butyl-2-chlorophenyl-N-methyl-0-methylamidophosphate (CRUFOMATE)
0,0-dimethyl-0-(3-methyl-4-methylmercaptophenyl)thiophosphate (FENTHION)
Isopropylamino-0-ethyl-0-(4-methylmercapto-3-methylphenyl)phosphate
0,0-diethyl-0-p-(methylsulphinyl)phenyl-thiophosphate (FENSULFOTHION)
0-p-(dimethylsulphamido)phenyl-0,0-dimethylthiophosphate (FAMPHUR)
0,0,0',0'-tetramethyl-0,0'-thiodi-p-phenylenethiophosphate
0-ethyl-S-phenyl-ethyldithiophosphate
0,0-dimethyl-0-(α-methylbenzyl-3-hydroxy-crotonyl)phosphate
2-chloro-1-(2,4-dichlorophenyl)vinyl-diethylphosphate (CHLORFENVINPHOS)

1-chloro-1-(2,4,5-trichlorophenyl)vinyl-dimethylphosphate
0-[2-chloro-1-(2,5-dichlorophenyl)]-0,0-diethylthiophosphate
Phenylglyoxylonitriloxim-0,0-diethylthiophosphate (PHOXIM)
0,0-diethyl-0-(3-chloro-4-methyl-2-oxo-2-H-1-benzopyran -7-yl)-thiophosphate (COUMAPHOS)
2,3-p-dioxandithiol-S,S-bis(0,0-diethyldithiophosphate) (DIOXATHION)
5-[(6-chloro-2-oxo-3-benzoxazolinyl)methyl]0,0-diethyldithiophosphate (PHOSALONE)
2-(diethoxyphosphinylimino)-1,3-dithiolane
0,0-dimethyl-S-[2-methoxy-1,3,4-thiadiazol -5-(4H)-onyl-(4)-methyl]dithiophosphate
0,0-dimethyl-S-phthalimidomethyl-dithiophosphate (IMIDAN)
0,0-diethyl-0-(3,5,6-trichloro-2-pyridyl)thiophosphate
0,0-diethyl-0-2-pyrazinylthiophosphate (THIONAZIN)
0,0-diethyl-0-(2-isopropyl-4-methyl-6-pyrimidyl)thiophosphate (DIAZINON)
0,0-diethyl-0-(2-chinoxalyl)thiophosphate
0,0-dimethyl-S-(4-oxo-1,2,3-benzotrizin-3(4H)-ylmethyl)-dithiophosphate (AZINPHOS-METHYL)
0,0-diethyl-S-(4-oxo-1,2,3-benzotriazin-3(4H)-ylmethyl)-dithiophosphate (AZINPHOSETHYL)
S-](4,6-diamino-s-triazin-2-yl)methyl]-0,0-dimethyldithiophosphate (MENAZON)
0,0-dimethyl-0-(3-chloro-4-nitrophenyl)thiophosphate (CHLORTHION
0,0-dimethyl-0(or S)-2-(ethylthioethyl)thiophosphate (DEMETONS-METHYL)
2-(0,0-dimethyl-phosphoryl-thiomethyl)-5-methoxy-pyron-4-3,4-dichlorobenzyl-triphenylphosphoniumchloride
0,0-diethyl-S-(2,5-dichlorophenylthiomethyl)dithiophoshpate (PHENKAPTON)
0,0-diethyl-0-(4-methyl-cumarinyl-7-)-thiophosphate (POTASAN)
5-amino-bis(dimethylamido)phosphinyl-3-phenyl-1,2,4-triazole (TRIAMIPHOS)
N-methyl-5-(0,0-dimethylthiolphosphoryl)-3-thiavaleramide (VAMIDOTHION)
0,0-diethyl-0-[2-diemthylamino-4-methylpyrimidyl-(6)]-thiophosphate (DIOCTHYL)
0,0-dimethyl-S-(methylcarbamoylmethyl)-thiophosphate (OMETHOATE)
0-ethyl-0-(8-quinolinyl)-phenylthiophosphonate (OXINOTHIOPHOS)
0-methyl-S-amidothiophosphate (MONITOR)
0-methyl-0-(2,5-dichloro-4-bromophenyl)-benzothiophosphate (PHOSVEL)
0,0,0,0-tetrapropyldithiophosphate
3-(dimethoxyphosphinyloxy)-N-methyl-N-methoxy-cis-crotonamide
0,0-diethyl-S-(N-ethylcarbamoylmethyl)dithiophosphate
0,0-diethyl-S-(N-isopropylcarbamoylmethyl)-dithiophosphate
S-N-(1-cyano-1-methylethyl)carbamoylmethyldiethylthiolphosphate
S-(2-acetamidoethyl)-0,0-dimethyldithiophosphate
Hexamethylphosphoric acid triamide (HEMPA)
0,0-dimethyl-0-(2-chloro-4-nitrophenyl)thiophosphate (DICAPTHON)
0,0-dimethyl-0-p-cyanophenyl thiophosphate (CYANOX)
0-ethyl-0-p-cyanophenylthiophosphonate
0,0-diethyl-0-2,4-dichlorophenylthiophosphate (DICHLORFENTHION)
0,2,4-dichlorophenyl-0-methylisopropylamidothiophosphate
0,0-diethyl-0-2,5-dichlor-4-bromophenylthiophosphate (BROMOPHOS-ETHYL)
Dimethyl-p-(methylthio)phenylphosphate
0,0-dimethyl-0-p-sulfamidophenylthiophosphate
0-]p-(p-chlorophenyl)azophenyl]0,0-dimethylthiophosphate (AZOTHOATE)
0-ethyl-S-4-chlorophenyl-ethyldithiophosphate
0-isobutyl-S-p-chlorophenyl-ethyldithiophosphate
0,0-dimethyl-S-p-chlorophenylthiophosphate
0,0-dimethyl-S-(p-chlorophenylthiomethyl)dithiophosphate
0,0-diethyl-p-chlorophenylmercaptomethyl-dithiophosphate (CARBOPHENOTHION)
0,0-diethyl-S-p-chlorophenylthiomethyl-thiophosphate
0,0-diethyl-S-(carbethoxy-phenylmethyl)dithiophosphate (PHENOTHOATE)
0,0-diethyl-S-(carbofluoroethoxy-phenylmethyl)-dithiophosphate
0,0-dimethyl-S-carboisopropoxy-phenylmethyl)-dithiophosphate
0,0-diethyl-7-hydroxy-3,4-tetramethylene-coumarinyl-thiophophosphate (COUMITHOATE)
2-methoxy-4-H-1,2,3-benzodioxaphosphorin-2-sulphide
0,0-diethyl-0-(5-phenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chloro-1-phthalimidoethyl)-0,0-diethyldithiophosphate
N-hydroxynaphthalimido-diethylphosphate
Dimethyl-3,5,6-trichloro-2-pyridylphosphate
0,0-dimethyl-0-(3,5,6-trichloro-2-pyridyl)thiophosphate
S-2-(ethylsulphonyl)ethyl dimethylthiolphosphate (DIOXYDEMETON-S-METHYL)
Diethyl-S-2-(ethylsulphinyl)ethyl dithiophosphate (OXIDISULFOTON)
Bis-0,0-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphate (BUTONATE)
0,0-dimethyl-0-(2,2-dichloro-1-methoxy-vinyl)phosphate
Bis-(dimethylamido)fluorophosphate (DIMEFOX)
3,4-dichlorobenzyl-triphenylphosphoniumchloride
Dimethyl-N-methoxymethylcarbamoylmethyl-dithiophosphate (FORMOCARBAM)
0,0-diethyl-0-(2,2-dichloro-1-chloroethoxyvinyl)-phosphate
0,0-diemthyl-0-(2,2-dichloro-1-chloroethoxyvinyl)-phosphate
0-ethyl-S,S-diephenyldithiolphosphate
0-ethyl-S-benzyl-phenyldithiophosphonate O,O-diethyl-S-benzyl-thiophosphate
O,O-dimethyl-S-(4-chlorophenylthiomethyl)dithiophosphate (METHYLCARBOPHENOTHION)
O,O-dimethyl-S-(ethylthiomethyl)dithiophosphate
Diisopropylaminofluorophosphate (MIPAFOX)
O,O-dimethyl-S-(morpholinylcarbamoylmethyl)dithiophosphate (MORPHOTHION)
Bismethylamido-phenylphosphate
O,O-dimethyl-S-(benzene sulphonyl)dithiophosphate
O,O-dimethyl-(S and O)-ethylsulphinylethylthiophosphate
O,O-diethyl-O-4-nitrophenylphosphate
Triethoxy-isopropoxy-bis(thiophosphinyl)disulphide
2-methoxy-4H-1,3,2-benzodioxaphosphorin-2-oxide
Octamethylpyrophosphoramide (SCHRADAN)
Bis (dimethoxythiospphinylsulphido)-pehnylmethane
N,N,N',N'-tetramethyldiamidofluorophosphate (DIMEFOX)
O-phenyl-O-p-nitrophenyl-methanthiophosphonate (COLEP)
O-methyl-O-(2-chloro-4-tert.butyl-phenyl)-N-methylamidothio-phosphate (NARLENE)
O-ethyl-O-(2,4-dichlorophenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide
O,O-di-(β-chloroethyl)-O-(3-chloro-4-methyl-coumarinyl-7)-phosphate
S-(1-phthalimidoethyl)-O,O-diethyldithiophosphate
O,O-dimethyl-O-(3-chloro-4-diethylsulphamylphenyl)-thiophosphate
O-methyl-O-(2-carbisopropoxyphenyl)-amidothiophosphate
5-(O,O-dimethylphosphoryl)-6-chloro-bicyclo(3.2.0)-heptadiene (1,5)
O-methyl-O-(2-i-propoxycarbonyl-1-methylvinyl)-ethylamidothiophosphate.

FORMAMIDINES 1-dimethyl-2-(2'-methyl-4'-chlorophenyl)-formamidine (CHLORPHENAMIDIN)
1-methyl-2-(2'-methyl-4'-chlorophenyl)-formamidine
1-methyl-2-(2'-methyl-4'-bromophenyl)-formamidine
1-methyl-2-(2',4'-dimethylphenyl)-formamidine
1-n-butyl-1-methyl-2-(2'-methyl-4'-chlorophenyl)-formamidine
1-methyl-1-(2'-methyl-4'-chloroaniline-metnylene)-formamidine
2-(2''-methyl-4'' 1-chlorophenyl)-formamidine
1-n-butyl-2-(2'-methyl-4'-chlorophenyl-imino)-pyrolidine.

Urea

N-2-methyl-4-chlorophenyl-N',N'-dimethyl-thiourea.

CARBAMIC ACID DERIVATIVES 1-naphthyl-N-methylcarbamate (CARBARYL)
2-butinyl-4-chlorophenylcarbamate
4-dimethylamino-3-tolyl-N-methylcarbamate (AMINOCARB)
4-methylthio-3,5-xylyl-N-methylcarbamate (METHIOCARB)
2-chlorophenyl-N-methylcarbamate (CPMC)
1-(dimethylcarbamoyl)-5-methyl-3-pyrazolyl-N,N-dimethylcarbamate (DIMHTHILAN)
2,3-dihydro-2,2-dimethyl-7-benzofuranyl-N-methylcarbamate (CARBOFURAN)
2-methyl-2-methylthiopropional-O-(methylcarbamoyl)-oxime(ALDICARB)
8-quinaldyl-N-methylcarbamate and salts thereof
3-isopropyl-5-methylphenyl-N-methylcarbamate (PROMECARB)
2-(1,3-dioxolan-2-yl)-phenyl-N-methylcarbamate (DIOXACARB)
2-(4,5-dimethyl-1,3-dioxalan-2-yl)-phenyl-N-methylcarbamate
2-(1,3-dithiolan-2-yl)-N,N-dimethylcarbamate
2-(1,3-dithiolan-2-yl)-phenyl-N,N-dimethylcarbamate
2-isopropoxyphenyl-N-methylcarbamate (APROCARB)
4-diallylamino-3,5-xylyl-N-methylcarbamate (ALLYXICARB)
1-isoproyl-3-methylpyrazol-5-methylpyrazol-5-yl-N,N-dimethylcarbamate (ISOLAN)
1-methylthioethylimino-N-methylcarbamate (METHOMYL).

CHLORINATED HYDROCARBONS

γ-hexachlorocyclohexane [GAMMEXANE; LINDAN: γ HCH]
1,2,3,4,5,6,7,8,8-octachloro-3α,4,7,7α'-tetrahydro-4,7-methylenindane [CHLORDAN]
1,4,5,6,7,8,8-heptachloro,3α,4,7,7α-tetrahydro-4,7-methylenindane [HEPTACHLOR]
1,2,3,4,10,10-hexachloro-1,4,4α,8,8α-hexahydro-endo-1,4-exo5,8-dimethanonaphthalene [ALDRIN]
1,2,3,4,10,10hexachloro-6,7-epoxy-1,4,4α,6,7,8,8α-octahydroendo-endo-5,8-dimethanonaphtalene [ENDRIN].

Moreover, the compounds of the formula I possess nematocidal properties and may be used, for example, to combat the following plant parasitic nematodes: Meloidogyne spp., Heterodera spp., Ditylenchus spp., Pratylenchus spp., Paratylenchus spp., Anguina spp., Helicotylenchus spp., Tylenchorhynchus spp., Rotylenchulus spp., Tylenchulus semipenetrans, Radopholis similus, Belonolaismus spp., Trichodorus spp., Longidorus spp., Aphelenchoides spp., Xiphinema spp.

The compounds of the formula I may be used as pure active substance or together with suitable carriers and/or additives. Suitable carriers and additives can be solid or liquid and correspond to the substances conventionally used in formulation technique such, for example, as solvents dispersants, wetting agents, adhesives, thickeners, binders and/or fertilisers.

For application, the compounds of the formula I may be processed to dust, emulsion concentrates, granules, dispersions, sprays, to solution, or suspensions in the conventional formulation which is commonly employed in application terminology. Mention may also be made of "cattle dips" and "spray races," in which aqueous preparations are used.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms: Solid forms Dusts, tracking agents, granules, coated granules, impregnated granules and homogeneous granules. Liquid forms:

a. active substances which are dispersible in water: wettable powders, pastes, emulsions;
b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminum silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the formula I in an organic solvent and applying the resulting solution to a granulated material, for example attapulgite, $SIO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g/litre to 600 g/litre can also be manufactured with the aid of atomisers. The dusting can be carried out from aircraft over extensive areas of cultures of useful plants.

It is also possible to obtain granules by compacting the carrier with the active substances and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivaties (methyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes) fatty alcohols, polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted wtih water to any concentration desired. They consist of active substance, carrier, optionally additives which stabilize the active substance, surface-active substance and anti-foam agents and, optionally, solvents Wettable powders and pasts are obtained by mixing and grinding the active substances with dispersing agents and pulverulent carriers in suitable apparatus until homogeneity is attained. Carriers are, for example, those mentouned for the solid forms of application. In some cases it is advantageous to the use mixtures of different carriers. As dispersing agents there can be used, for example, condensation products or sulfonated naphthalene and sulfonated naphthalene derivatives with formaldehyde, condensation produts of naphthalene or naphthalene sulfonic acids with phenol and formaldehyde, as well as alkali, ammonium and alkaline earth metal salts of lignin sulfonic acid, in addition, alkaylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam are silicones.

The active substances are mixed, ground, sieved and strained with the additives mentioned above that, in wettable powder, the solid particle size of from 0.02 to 0.04 and in pasts, of 0.03 is not exceeded. To produce emulsifiable concentrates and pastes, dispersing agents such as those cited above, organic solvents and water are used. Examples of suitable solvents are the following: alcohols, benzene, xylenes, toluene dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substances or several active substances of the general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1 to 95 percent in which connection it should be mentioned that in the case of application from aircraft or some other suitable means of application, it is possible to use concentrations of up to 99.5 percent or even pure active substance.

The active substances of the formula I can, for example, be formulated as follows:

Dusts

The following substances are used to manufacture (a) a 5% and (b) a 2% dust:

and dissolved with 6 parts of acetone; the polyethylene glycol and cetyl polyglycol ether are then added. The thus obtained solution is sprayed on to kaolin, and the acetone subsequently evaporated in vacuo.

WETTABLE POWDER:

The following constituents are used for the preparation of (a) a 40%, (b) and (c) a 25 %, and (d) a 10% wettable powder:

a)
- 40 parts of active substance,
- 5 parts of sodium lignin sulphonate,
- 1 part of sodium dibutyl-naphthalene sulphonate,
- 54 parts of silica acid.

b)
- 25 parts of active substance,
- 4.5 parts of calcium lignin sulphonate
- 1.9 parts of Champagne chalk/hydroxyethyl cellulose mixture (1:1),
- 1.5 parts of sodium dibutyl naphthalene sulphonate,
- 19.5 parts of silica acid,
- 19.5 parts of Champagne chalk,
- 28.1 parts of kaolin.

c)
- 25 parts of active substance,
- 2.5 parts of isooctylphenoxy-polyoxyethylene-ethanol,
- 1.7 parts of Champagne chalk/hydroxyethyl cellulose mixture (1:1),
- 8.3 parts of sodium aluminium silicate,
- 16.5 parts of kieselguhr,
- 46 parts of kaolin.

d)
- 10 parts of active substance,
- 3 parts of a mixture of the sodium salts of saturated fatty alcohol sulphates,
- 5 parts of naphthalenesulphonic acid/formaldehyde condensate,
- 82 parts of kaolin.

The active substances are intimately mixed, in suitable mixers, with the additives, the mixture being then ground in the appropriate mills and rollers. Wettable powder are obtained which can be diluted with water to give suspensions of any desired concentration.

EMULSIFIABLE CONCENTRATES:

The following substances are used to produce (a) a 10 percent and (b) a 25% emulsifiable concentrate:

a)
- 10 parts of active substance,
- 3.4 parts of epoxidised vegetable oil,
- 13.4 parts of a combination emulsifier consisting of fatty alcohol polyglycol ether and alkylarylsulphonate calcium salt,
- 40 parts of dimethylformamide,
- 43.2 parts of xylene.

b)
- 25 parts of active substance,
- 2.5 parts of epoxidised vegetable oil, a)
- 5 parts of active substance
- 95 parts of talcum b)
- 2 parts of active substance
- 1 part of highly disperse silica
- 97 parts of talcum.

The active substances are mixed with the carriers and ground.

GRANULES

The following substances are used to produce 5% granules:
- 5 parts of active substance,
- 0.25 parts of epichlorohydrin,
- 0.25 parts of cetyl polyglycol ether,
- 3.50 parts of polyethylene glycol,
- 91 parts of kaolin (particle size 0.3 – 0.8 mm).

The active substance is mixed with epichlorohydrin

-Continued
- 10 parts of an alkylarylsulphonate/fatty alcohol-polyglycol ether mixture
- 5 parts of dimethylformamide,
- 57.5 parts of xylene.

From these concentrates it is possible to ptoduce, by dilution with wter, emulsion of any desired concentration.

SPRAY:

The following constituents ar used to prepare a 5 percent spray:
- 5 parts of active substance,
- 1 part of epichlorohydrin,
- 94 parts of benzine (boiling limits 160° – 190°C).

EXAMPLE 1

63.5 Grams of 1-isopropyl-3-hydroxyl-1,2,4-triazole and 69 g of potassium carbonate in 1500 lml of methyl ethyl ketone are refluxed for 1 hour.

After the mixture has cooled to room temperature, 54 g of dimethyl carbamyl chloride in 100 ml of methyl ethyl ketone are added dropwise thereto. The solution is heated again to the boil for 2 hours and after it has cooled, the salts are filtered off and the filtrate is concentrated. The liquid residue is taken up in methanol and cooled in a carbon dioxide/acetone bath to −70°C. The precipitated crystalline active substance of the formula

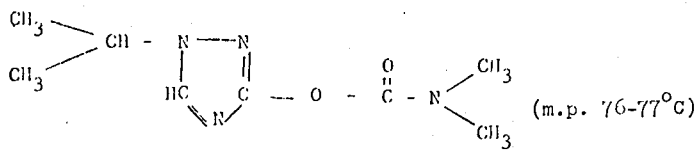

is filtered off and dried for 6 hours in vacuo (40°C/15 mm P.g.). The following compounds are manufactured in analogous manner:

| Compounds | |
|---|---|
| N,N-dimethylcarbamoyl-[1- thyl-1,2,4-triazolyl-(3)]-ester | m.f.:57–68°C |
| N,N-dimethylcarbamoyl-[1-n-propyl-1,2,4-triazolyl-(3)]-ester | m.f.:55–58°C |
| N,N-dimethylcarbamoyl-[1-isopropyl-1,2,4-triazolyl-(3)]-ester | do. : 76–77°C |
| N,N-dimethylcarbamoyl-[1-n-butyl-1,2,4-triazolyl-(3)]-ester | do. : 31–35°C |
| N,N-dimethylcarbamoyl-[1-sec-butyl-1,2,4-triazolyl-(3)]-ester | do. : 44–53°C |
| N,N-dimethylcarbamoyl-[1-isobutyl-1,2,4-triazolyl-(3)]-ester | do. : 71–73°C |
| N,N-dimethylcarbamoyl-[1-sec.-pentyl-1,2,4-triazolyl-(3)]-ester | do. : 33–37°C |
| N,N-dimethylcarbamoyl-[1-n-hexyl-1,2,4-triazolyl-(3)]-ester | do. : 36–38°C |
| N,N-dimethylcarbamoyl-[1-cyclopentyl-1,2,4-triazolyl-(3)]-ester | $n_D^{20}$: 1,4969 |
| N,N-dimethylcarbamoyl-[1-ethyl-5-methyl-1,2,4-triazolyl-(3)]-ester | m.f.:109–110° |
| N,N-dimethylcarbamoyl-[1-isopropyl-5-methyl-1,2,4-triazolyl-(3)]-ester | |
| N,N-dimethylcarbamoyl-[1-isopropyl-5-ethoxycarbonyl-1,2,4-triazolyl-(3)]-ester | do. : 64°C |
| N,N-diethylcarbamoyl-[1-isopropyl-1,2,4-triazolyl-(3)]-ester | $n_D^{20}$: 1.4721 |

| Compounds | |
|---|---|
| N,N-dimethylcarbamoyl-[1-(1',2',2'-trimethyl-propyl)-1,2,4-triazolyl-(3)]-ester | m.f.:97–100°C |
| N,N-dimethylcarbamoyl-[1-(1'-ethylpropyl)-1,2,4-triazolyl-(3)]-ester | do. : 58–60°C |
| N,N-dimethylcarbamoyl-[1-isopropyl-5-ethyl-1,2,4-triazolyl-(3)]-ester | do. : 83–85°C |
| N,-methyl-N-methoxycarbamoyl-[1-isopropyl-1,2,4-triazolyl-(3)]-ester | do. : 62–65°C |
| N,N-dimethylcarbamoyl-[1-isopropyl-5-cyano-1,2,4-triazolyl-(3)]-ester | |
| N,N-dimethylcarbamoyl-[1-sec-pentyl-1,2,4-triazolyl-(3)]-ester | $n_D^{20} = 1.4650$ |
| N,N-dimethylcarbamoyl-[1,5-diisopropyl-1,2,4-triazolyl-(3)]-ester | |

EXAMPLE 2

A. Insecticidal Ingest poison action

Tobacco and potato plants was sprayed with a 0.05 percent aqueous emulsion (obtained from a 10 percent emulsifiable concentrate).

After the coating had dried, Egyptian cotton leaf worms (Spodoptera literalis) were settled on the tobacco plants and Colarado potato beetle larvae (Leptinotarsa decemlineata) on the potato plants. The test was carried out at 24°C and 60 percent relative humidity.

The compounds according to Example 1 displayed an ingest poison action in the above test against Spodoptera litoralis and Leptinotatarsa decemlineata.

B. Systemic insecticidal action

To determine the system action, rooted bean plants (Vicia fabae) were put into a 0.01 percent aqueous active substance solution (obtained from a 10 percent emulsifiable concentrate). After 24 hours, aphids (Aphis fabae) were placed on the parts of the plant above the soil. The aphids was protected from contact and gas action by means of a special device. The test was carried out at 24°C and 70 percent relative humidity. In the above test the compounds according to Example 1 have a systemic action against Aphis fabae.

EXAMPLE 3

Action against soil nematodes

To test the action against soil nematodes, the active substances (in a concentration of 50 mmp) is applied to and intimately mixed with soil infected wtih post gall nematodes (Meloidgyne Avenaria). Immediately afterwards, tomato cuttings are planted in the thus prepared soil in a series of tests and after a waiting time of 8 days tomato seeds are sown in another test series.

In order to assess the nematocidal action, the galls present on the roots are counted 28 days after planting and sowing respectively. The compounds according to Example 1 display a nematocidal action in the above test.

We claim:

1. An insecticidal composition comprising an insecticidally effective amount of a compound of the formula

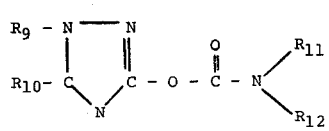

wherein $R_9$ represents $C_1-C_6$ alkyl, cyclopentyl or cyclohexyl, $R_{10}$ represents hydrogen, $C_1-C_4$ alkyl or the groups $-COOCH_3$, $-COOC_2H_5$ or

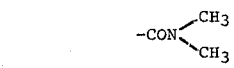

$R_{11}$ represents hydrogen, methyl or ethyl, and $R_{12}$ represents methyl, ethyl, methoxy or phenyl; together with a suitable carrier therefor.

2. The composition of claim 1, wherein said compound is

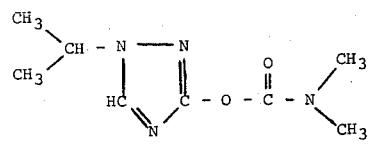

3. The composition of claim 1, wherein said compound is

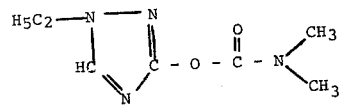

4. The composition of claim 1, wherein said compound is

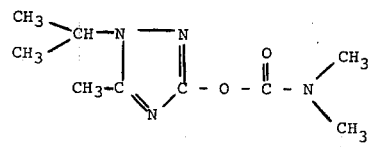

5. The composition of claim 1, wherein said compound is

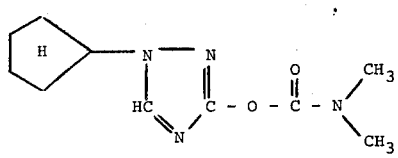

6. A method for combatting insects which comprises applying to the locus thereof an insecticidally effective

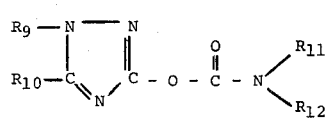

wherein $R_9$ represents $C_1-C_6$ alkyl, cyclopentyl or cyclohexyl, $R_{10}$ represents hydrogen, $C_1-C_4$ alkyl or the groups $-COOCH_3$, $-COOC_2H_5$ or

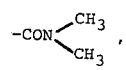

$R_{11}$ represents hydrogen, methyl or ethyl, and $R_{12}$ represents methyl, ethyl, methoxy or phenyl.
7. The method of claim 6, wherein said compound is
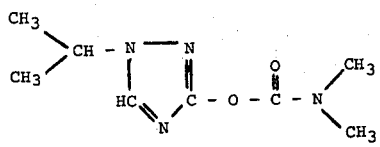
8. The method of claim 6, wherein said compound is
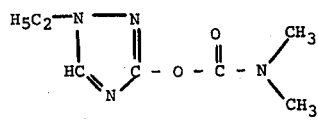
9. The method of claim 6, wherein said compound is
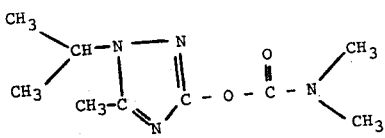
10. The method of claim 6, wherein said compound is
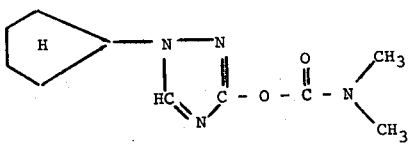
* * * * *